Figure 8:
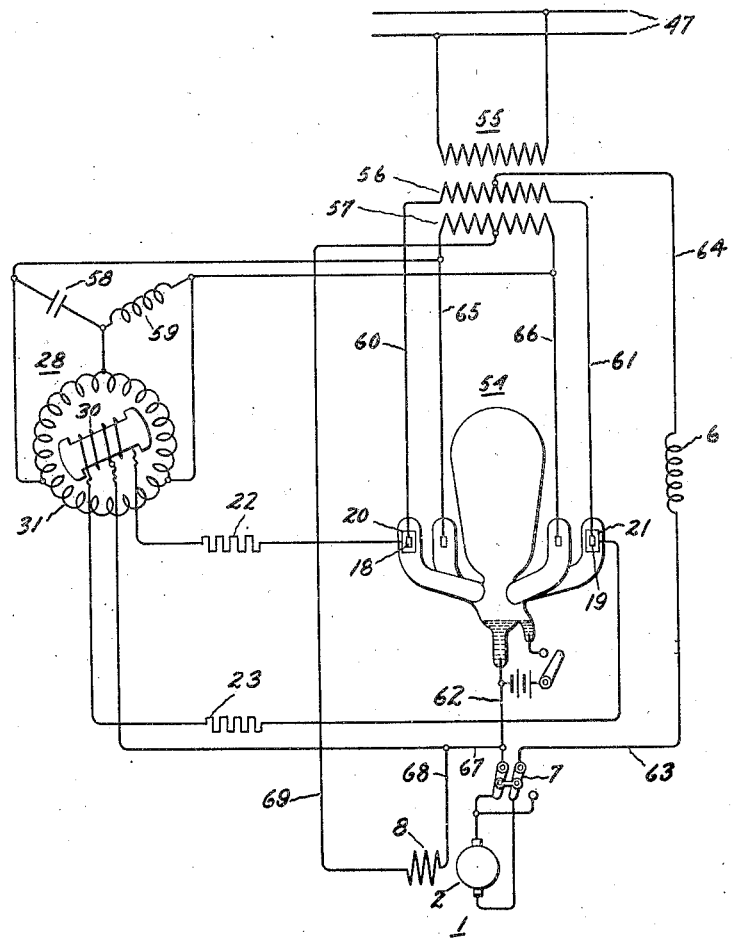

Jan. 3, 1928.
E. F. W. ALEXANDERSON ET AL
1,655,036
CONTROL OF ELECTRIC POWER
Filed April 25, 1925   5 Sheets-Sheet 1
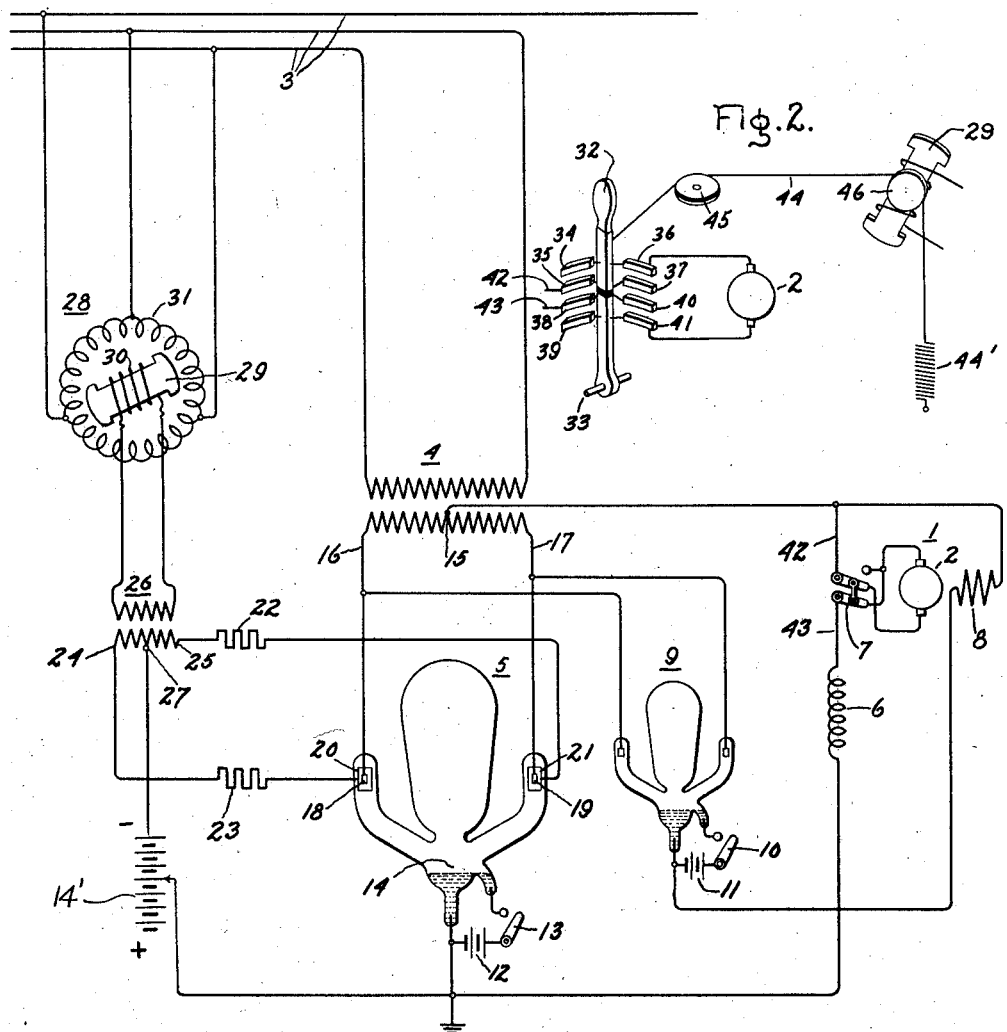
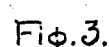
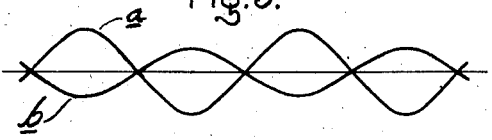
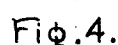
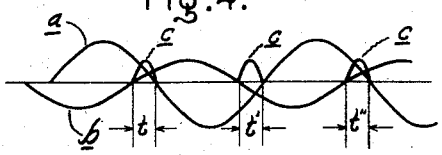
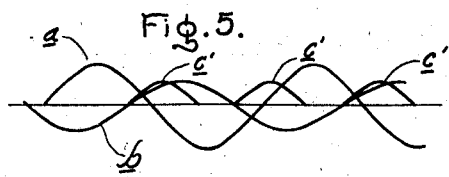
Inventors:
Ernst F. W. Alexanderson,
Albert H. Mittag,
by *Alexander ... (signature)*
Their Attorney.

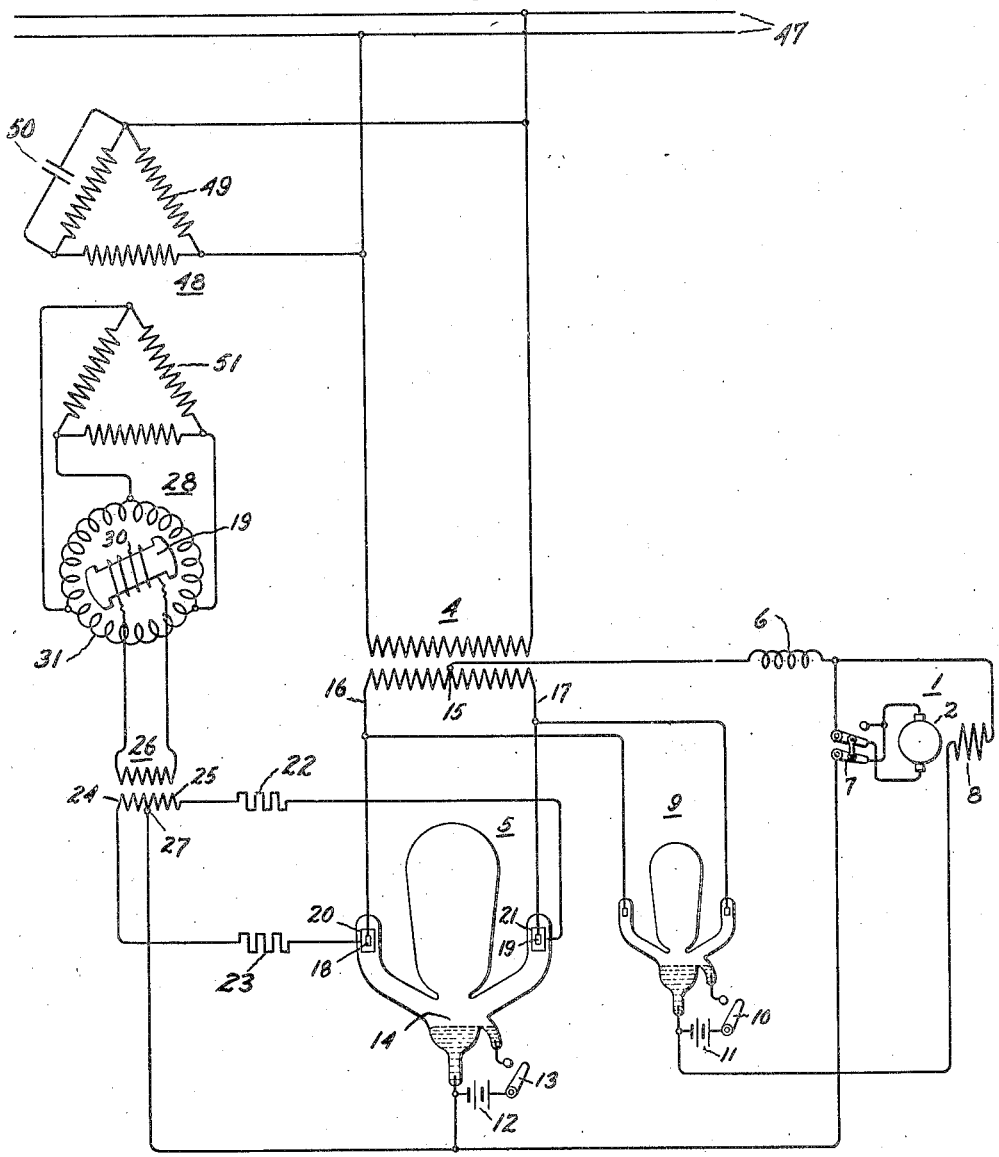

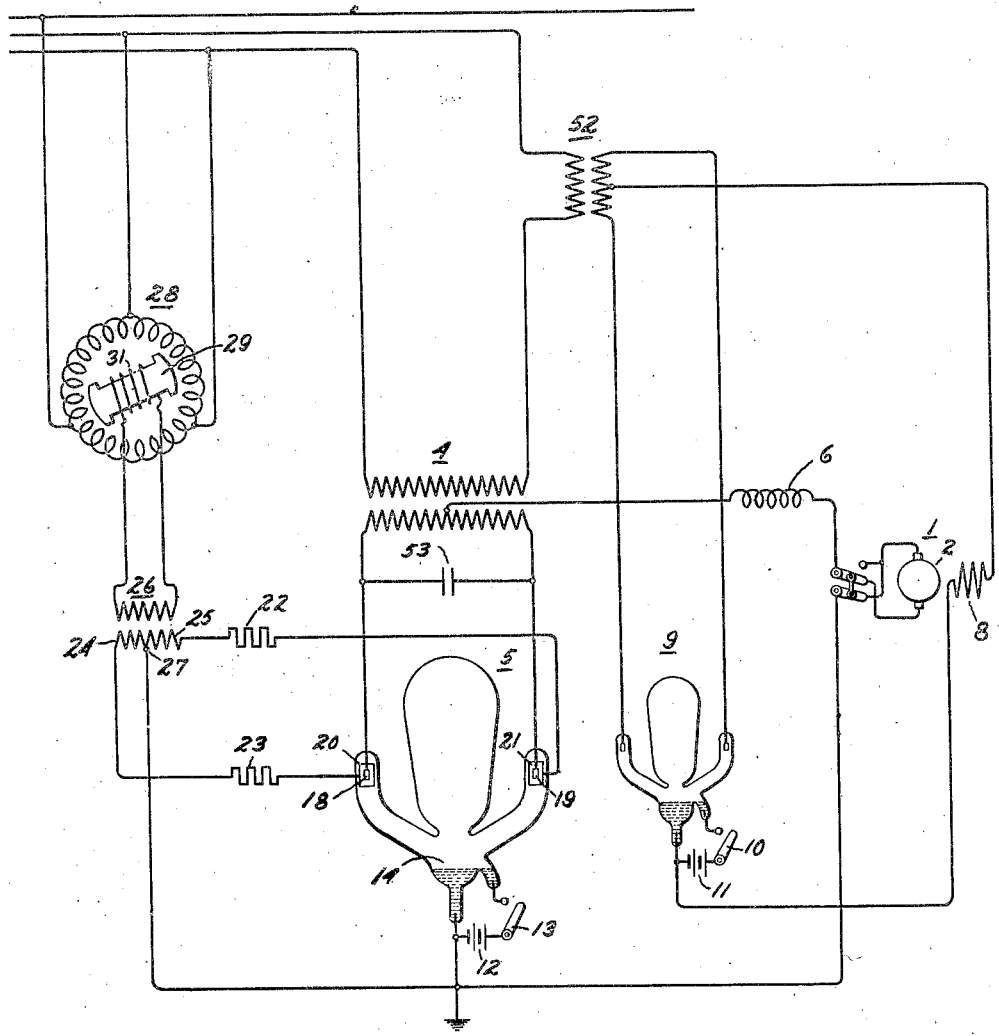

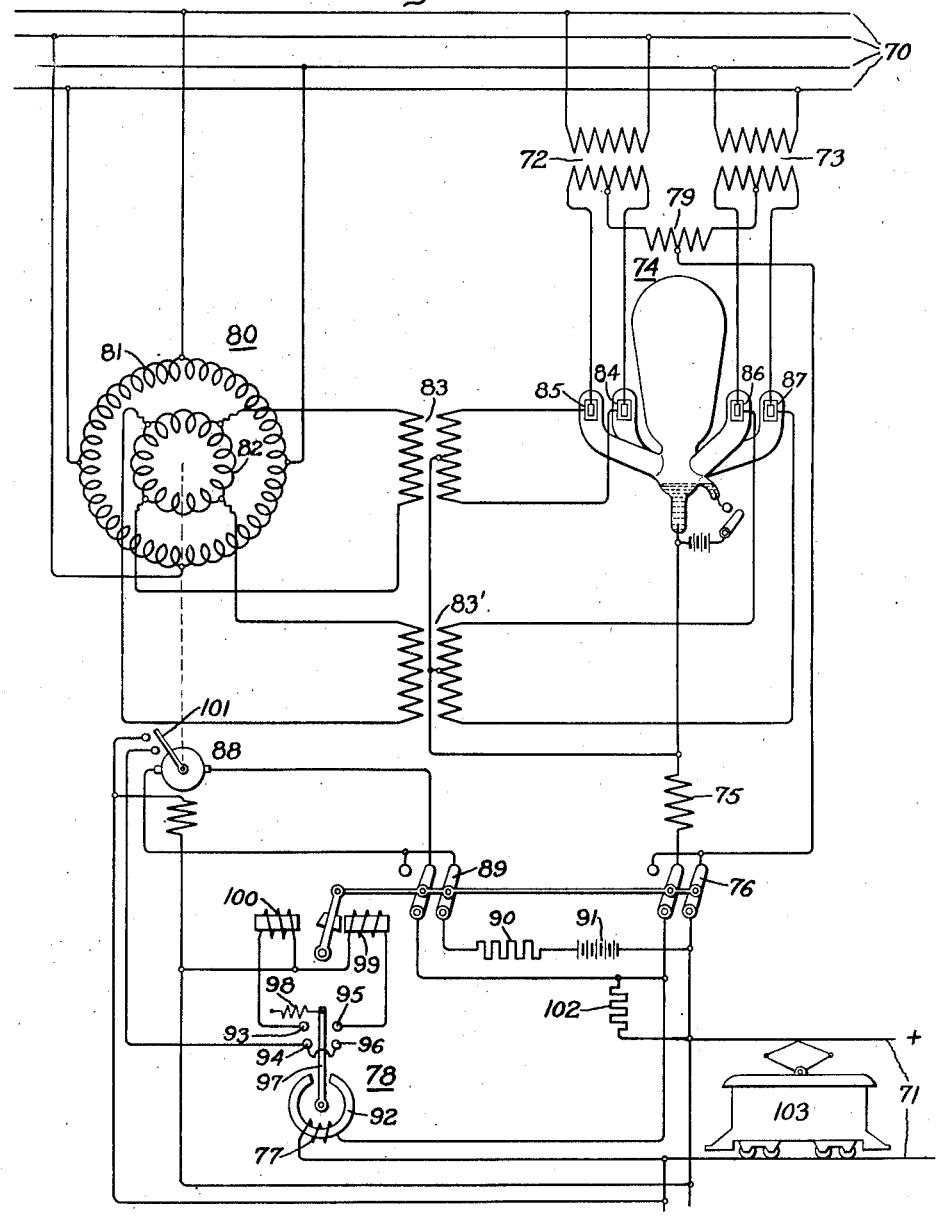

Patented Jan. 3, 1928.

1,655,036

UNITED STATES PATENT OFFICE.

ERNST F. W. ALEXANDERSON AND ALBERT H. MITTAG, OF SCHENECTADY, NEW YORK, ASSIGNORS TO GENERAL ELECTRIC COMPANY, A CORPORATION OF NEW YORK.

CONTROL OF ELECTRIC POWER.

Application filed April 25, 1925. Serial No. 25,913.

Our invention relates to the control of electric power transmitted between different machines or systems, and has for its principal object the provision of an improved apparatus which may be utilized to control and rectify or derectify the current interchanged between direct and alternating current systems or machines and which may be operated readily to vary the relation between the electrical characteristics of these systems or machines. A further object is the provision of an improved method of speed control for direct current machines connected to an alternating current system through a rectifying device and operated either as motors or generators.

Where power is interchanged between direct and alternating current systems, it is frequently necessary that the electrical characteristics of one of the systems be varied independently of the conditions under which the other system is operated. Thus, for example, in the case of a variable speed direct current machine connected through an electron discharge device to an alternating current system, it is desirable that the voltage of the machine be varied independently of the alternating current system voltage for the purpose of controlling the machine speed while either motoring or regenerating. Likewise where power is interchanged between direct and alternating current systems, it is sometimes desirable that the voltage of one of the systems be varied to effect the proper interchange of power between the systems. In accordance with our invention, these results are produced either by variation in the phase of an alternating voltage applied to grid members interposed between the cathode and anodes of the discharge device through which the alternating current system is connected to the direct current system or machine, or by variation in the magnitude of a direct current voltage likewise applied to the grid members of this device.

Our invention will be better understood from the following description when considered in connection with the accompanying drawings, and its scope will be pointed out in the appended claims.

Referring to the drawings, Fig. 1 shows a control system wherein our invention has been embodied; Fig. 2 shows a detail of the system illustrated by Fig. 1; Figs. 3, 4 and 5 show various operating characteristics of the arrangement of Fig. 1; Fig. 6 shows a modification in the arrangement for controlling the grid voltage of the rectifying device; Fig. 7 shows our invention as applied to a machine connected to operate with series characteristics; Fig. 8 shows the use of a single device for rectifying both the field and armature currents of an electric machine, and Fig. 9 shows a further modification of our invention.

Fig. 1 shows a direct current machine 1, which is arranged to have its armature winding 2 connected to one phase of a polyphase line 3 through a transformer 4, a vapor electric device 5, a reactor 6 and a reversing switch 7, and to have its field winding 8 connected to the same phase of the polyphase line 3 through transformer 4 and a vapor electric device shown as a mercury rectifier 9 provided with a starting switch 10 and source of potential 11. A source of potential 12 and switch 13 are provided for initiating operation of the device 5 in a well known manner. It will be observed that the device 5 comprises a mercury cathode 14, a pair of anodes 18 and 19 and a pair of grid members 20 and 21; that the cathode 14 is connected through reactor 6, switch 7 and armature winding 2 to the secondary circuit of transformer 4 at 15; that the anodes 18 and 19 are connected to the secondary terminals 16 and 17 respectively, of the transformer 4; that the grid members 20 and 21 are connected through resistors 22 and 23 respectively to the secondary terminals 24 and 25 of a transformer 26; that the cathode 14 is connected to the secondary circuit of transformer 26 at 27; and that the primary circuit of the transformer 26 is connected to the alternating current system 3 through a well known type of phase control device 28 comprising a rotor member 29 upon which a coil 30 is wound and a stator member which is provided with a polyphase winding 31 adapted to produce a rotating field. With these connections, the phase control device 28 may be operated to vary the grid voltage of the device 5 in a manner which will be readily understood from a consideration of Figs. 3, 4 and 5.

In Fig. 3, the magnitudes of the voltage applied to the device 5 through the transformer 4 at succeeding instants of time are represented by the curve $a$ and the magnitudes of the voltage applied to grid members 20 and 21 through the phase control device 28 at the same instant of time are shown by the curve *b*. With the curves *a* and *b* displaced by 180 degrees, as shown, the grid 20 will be negatively charged when the anode 18 is charged to a positive potential; the grid 21 will be charged negatively when the anode 19 is positively charged; and the transmission of current through the device 5 will be prevented.

Fig. 4 shows the relation established between the curveres *a* and *b* when the phase of the grid voltage is shifted with respect to that of the anode voltage by means of the device 28. With this relation established, the grids and anodes of the device 5 are simultaneously charged to positive potentials during intervals of time represented by *t*, *t'* and *t''*, and a current represented by the curves *c* is transmitted through the device 5 at a voltage which is very considerably below the maximum secondary voltage of the transformer 4. As the phase difference between the curves *a* and *b* is decreased by means of the device 28, however, both the intervals of time during which current is transmitted through the device 5 and the voltage at which this current is transmitted are increased until, with the grid and anode voltages in phase, the complete wave is rectified and current is transmitted at substantially the full secondary voltage of the transformer 4. It will thus be observed that the instantaneous value of the main circuit voltage at which the transmission of current through the device 4 is initiated is determined by the phase of the grid voltage. When it is desired to interrupt the circuit between the line 3 and machine 1, the device 28 is operated to bring the grid and anode voltages into the phase relationship indicated by Fig. 3. The device 5 and its control apparatus thus not only serve to rectify or derectify the current transmitted between the system 3 and machine 1, and to vary the voltage at which this current is transmitted, but also functions to interrupt the circuit through which the current is transmitted. Instead of varying the phase of the grid voltage to control the voltage relation between the direct and alternating current circuits, it is of course possible to accomplish a similar result either by means of a unidirectional voltage applied to the grids 20 and 21 in a manner to determine the point of the alternating wave at which the transmission of current through the device 4 is initiated or by the combined effect of a unidirectional voltage and an alternating voltage of variable phase. One way of accomplishing this result is to interpose a direct current source 14' between the secondary circuit of transformer 26 and the cathode 14 of device 5 as illustrated in Fig. 1. By adjusting the potential of the source 14' the curve *b* is displaced in a direction at right angles to the reference line and the instant at which the device 5 begins to transmit current is changed.

The resistors 22 and 23 are interposed in the grid or control circuits of the device 5 for limiting the current transmitted through these circuits. The reactor 6 is connected in the armature circuit of the motor 1 for smoothing out pulsations in the current transmitted through the device 5 and improving the speed torque characteristics of the machine 1. The effect of this inductance is indicated by the curves *c'* of Fig. 5, which correspond to the curves *c* of Fig. 4. As the phase difference between the curves *a* and *b* is decreased the curves *c'* overlap one another and direct current of substantially constant value is transmitted to the machine 1.

Where it is desired to operate the machine 1 either as a motor or as a generator, the rotor member 29 of the device 28 and the motor armature reversing switch 7 may be interlocked, as diagrammatically shown by Fig. 2, for the purpose of ensuring that the switch 7 is operated only when grid and anode voltages of the device 5 are opposed and the circuit between the transformer 4 and machine 1 is interrupted.

Fig. 2 shows a control lever 32 pivoted at 33 and provided with insulated conductive sections one of which is arranged to engage contacts 34, 35, 36 and 37, and the other of which is arranged to engage the contacts 38, 39, 40 and 41, the contact 34 being connected to the contact 36, the contact 35 being connected to contact 40, the contact 38 being connected to the contact 37, and the contact 39 being connected to the contact 41. With these connections, current may be supplied to the armature winding 2 through leads 42 and 43. The lever 32 is biased to its illustrated off position by suitable means shown as a spring 44' with which it is connected through a flexible connection 44 arranged to cooperate with an idler 45 and a pulley 46 coupled to the rotor member 29 of the phase control device 28. Instead of the arrangement shown by Fig. 2, any other suitable means may be utilized to vary the phase difference between the grid and plate voltages of the device 28 through 180 electrical degrees.

Assuming the lever 32 to be in its illustrated position and the rotor member 29 to be adjusted to produce a phase difference of 180 electrical degrees between the plate and grid voltages of the device 5, we have found that the machine 1 may be accelerated as a motor by moving the lever 32 to the right, thereby connecting the machine to the secondary circuit of the transformer 4 through the device 5, and shifting the phase of the grid potential of this device in a manner gradually to increase the torque of the machine; that the transmission of current to the machine may be interrupted by moving the lever to its mid-position, thereby interrupting the armature circuit of the machine first at the device 5 and then at the reversing switch; and that the machine may be caused to generate current and to supply this current to the line 3 through the device 5 by moving the lever 32 to the left in a manner to reverse the armature connections and decrease the phase difference between the grid and plate voltages of the device 5. It will of course be apparent that the machine 1 may be accelerated as a motor by moving the lever 32 in either direction from its illustrated position and that when it is not desired to operate the machine 1 both as a motor and as a generator the current transmitted through the device 5 may be controlled altogether by means of the phase control device 28.

Fig. 6 shows a speed control and regenerating system which is in most respects similar to that previously described, but differs therefrom in that the primary circuit of the transformer 4 is connected to a single phase line 47 and in that current is supplied to the phase control device 28 through a phase converting apparatus 48 comprising a polyphase primary winding 49 connected to the line 47 and to the condenser 50 and inductively related to a secondary winding 51 which is connected to the stator winding 31 of the phase control device 28. The phase converting device 48 is provided for producing a rotating field in the stator member of the phase control device 28. The operation of the system will be readily understood from what has been said with respect to Fig. 1. With the field connections shown in Figs. 1 and 6, the machine 1 will operate either as a motor or as a generator with shunt characteristics.

Fig. 7 shows a speed control and regenerating system wherein the machine field winding 8 is supplied with current through a series transformer 52 connected to a lead of the transformer 4. With this connection, the field excitation is substantially proportional to the armature current of the machine. In order to facilitate regeneration, it is desirable that a condenser 53, or other suitable means, be connected across the secondary circuit of the transformer 4 to ensure that the field winding 8 is excited when the armature current is zero. The amount of this excitation is of course determined by the condenser 53.

Fig. 8 shows a system which differs from those previously described in several respects. In this system, current is interchanged between the single phase line 47 and the motor field and armature windings through a single rectifying device 54 and a transformer 55 comprising secondary circuits 56 and 57; the inducing winding 31 of the phase control device 28 is connected to the secondary winding 57 through a phase converting apparatus shown as condenser 58 and reactor 59; and the circuits of grids 20 and 21 are directly connected to the rotor winding 30 of the phase control device 28. It will be observed that the secondary winding 56 functions to transmit current between the line 47 and machine armature winding 2 through leads 60 and 61, device 54, conductor 62, switch 7, conductor 63, reactor 6 and conductor 64; and that the secondary circuit 57 functions to transmit current to the field winding 8 through conductors 65 and 66, device 54, and conductors 62, 67, 68 and 69. If it is desired to operate the machine 1 with series characteristics, the leads 65 and 66 will be connected to a series transformer similar to the transformer 52 of Fig. 7 instead of the secondary 57 of the transformer 55. The operation of the system shown by Fig. 8 will be readily understood in view of the previous explanations.

Fig. 9 shows an arrangement wherein current is interchanged between a polyphase alternating current circuit 70 and a direct current circuit 71 through transformers 72 and 73, rectifier 74, reactor 75, reversing switch 76, operating coil 77 of a polarized relay 78 and an interphase transformer 79 connected between the midpoints of the transformer secondary circuits for insuring the proper division of current between the transformers 72 and 73. A phase control device 80 comprising a polyphase stator winding 81 connected to the alternating current circuit 70 and a polyphase rotor winding 82 connected through transformers 83 and 83' to grids 84, 85, 86 and 87 is provided for controlling the grid potential of the rectifying device 74 in a manner previously explained. Operation of the device 80 is controlled by a motor 88 which is connected to the direct current load circuit of the rectifying device 74 through reversing switch 89, resistor 90, and battery 91, which is utilized to operate the motor 88 and phase control device 80 in a manner to maintain the voltage of the direct current load circuit at a value predetermined by the battery voltage.

The polarized relay 78 comprises the operating coil 77, contacts 93 to 96 inclusive, and an armature contact member 97 which is arranged to cooperate with the contacts 93 to 96 for controlling the energization of the solenoids 99 and 100 through which operation of the switches 89 and 76 is effected. An interlock 101 is operated by the motor 88 for the purpose of ensuring that the grid and anode voltages of the device 74 are opposed when the reversing switches 89 and 76 are operated. An auxiliary load shown as a resistor 102 is connected across the direct current circuit of the rectifier to facilitate operation of the polarized relay 78 when the transfer of power from circuit 71 to circuit 70 is initiated. A load device, shown as an electric locomotive 103, is connected across the direct current load circuit 71.

Assuming the switches 89 and 76 and the contact member 97 to be in their left-hand positions and operation of the device 74 to have been initiated by operation of its starting switch, it will be readily understood that variations in the value of the rectified voltage above and below that of the battery voltage will cause current to be transmitted through the armature circuit of the motor 88 in opposite directions, thus always operating the motor 88 and phase control device 80 in a manner to make the rectified voltage the same as that of the battery. When these two volages are equal, the motor 88 is stationary. During motoring of the load device machines, the direct current voltage of the rectifier is thus automatically maintained at a voltage substantially the same as the battery voltage.

During the transition period between motoring and regenerating of the load device machines when the voltage of these machines becomes larger than the battery voltage, current is supplied from the circuit 71 through the resistor 102 to the relay operating coil 77 for moving the contact member 97 into engagement with the contacts 95 and 96, and through reversing switch 89, resistor 90 and battery 91 to the armature circuit of the motor 88 for moving the interlock member 101 into engagement with its cooperating contacts. The resistor 90 is provided for limiting the discharge of the battery while the voltage of the load device machines is lower than that of the battery. So long as the switches 89 and 76 are closed in their left-hand positions, no current is supplied from the direct current circuit 71 through the rectifier 74 to the alternating current circuit 70. As soon as the interlock member 101 engages its cooperating contacts, however, the solenoid 99 is energized by current supplied from the circuit 71 and the switches 89 and 76 are operated to their illustrated positions thereby reversing the connections between the rectifying device and the direct current load circuit and permitting the transmission of current from the circuit 71 to the circuit 70 at a voltage determined by the battery 91 as previously explained. Should the load device machine connections be changed to terminate the generating action of these machines, current is supplied from the battery 91 to the coil 77 through the field winding of motor 88 in a manner tending to move the contact member 97 into contacts 93 and 94. If this current is insufficient to operate the relay prompt interconnection of the contacts 93 and 94 by members 97 is produced by spring 98. At the same time current is supplied to the armature of motor 88 in a manner to move interlock member 101 into engagement with its cooperating contacts thereby energizing the solenoid coil 100 and moving the switches 89 and 76 into a position suitable for motoring.

The embodiments of the invention illustrated and described herein have been selected for the purpose of clearly setting forth the principles involved. It will be apparent, however, that the invention is susceptible of being modified to meet the different conditions encountered in its use and we therefore aim to cover by the apended claims all modifications within the true spirit and scope of our invention.

What we claim as new and desire to secure by Letters Patent of the United States is:—

1. The combination of an alternating current system, a direct current motor, a vapor electric device connected between said system and said motor, a grid control circuit for said device, means for varying the phase of the voltage applied to said circuit in a manner to control the speed of said motor and to interrupt the transmission of current between said system and said motor, and means arranged to apply a unidirectional bias potential to said circuit.

2. The combination of an alternating current system, a direct current machine, an electron discharge device connected between said system and said machine, a grid control circuit for said device, control means for varying the phase of the voltage applied to said circuit in a manner to control the power interchanged between said system and said machine, means for reversing the armature connections of said machine, and means for correlating the operation of said control and armature reversing means in a manner to produce opening of said armature circuit only when the power interchanged between said system and said machine has been reduced to a predetermined value by said device.

3. The combination of an alternating current system, a direct current machine comprising armature and field windings, an electron discharge device connected between said system and said armature winding, a grid circuit for controlling the current interchanged between said system and said armature winding through said device, means connected to said system in series with said device for controlling the excitation of said field winding in accordance with the armature current of said machine, and means connected to said system in parallel with said device for maintaining the field excitation of said machine when said control circuit has been operated to interrupt the interchange of power between said system and said armature winding.

4. The combination of an alternating current system, a direct current machine comprising armature and field windings, a vapor electric device connected between said system and said armature winding, a grid circuit for controlling the current interchanged between said system and said armature winding through said device, means connected to said system for controlling the excitation of said field winding, and a control device for varying the phase of the voltage applied to said grid circuit.

5. The method of operating a direct current machine having its armature circuit connected to an alternating current system through an electron discharge device wherein a grid is interposed between a cathode and an anode and wherein a voltage is applied to said grid for controlling the operation of said device, which comprises changing the phase difference between the voltage of said system and said grid to vary the speed of said machine.

6. The method of operating a direct current machine having its armature circuit connected to an alternating current system through an electron discharge device wherein a grid is interposed between a cathode and an anode and wherein a voltage is applied to said grid for controlling the operation of said device, which comprises decreasing the phase difference between the voltages of said system and said grid to increase the speed of said machine, and increasing the phase difference between said system and grid voltages to decrease the speed of said machine and interrupt the transmission of current through the armature circuit thereof.

7. The method of operating a direct current machine having its armature circuit connected to an alternating current system through an electron discharge device wherein a grid is interposed between a cathode and an anode and wherein a voltage is applied to said grid for controlling the operation of said device, which comprises decreasing the phase difference between the voltages of said system and said grid to accelerate said machine as a motor, increasing the phase difference between said system and grid voltages to decelerate said machine and interrupt the armature circuit thereof, and varying the phase difference between said system and grid voltages to control the speed of said machine while it is driven as a generator.

8. The combination of an alternating current system, a direct current machine comprising armature and field windings, an electron discharge device connected between said system and said armature winding, a grid circuit for controlling the current interchanged between said system and said armature winding through said device, and means connected to said system in series with said device for controlling the excitation of said field winding in accordance with the armature current of said machine.

In witness whereof, we have hereunto set our hands this 24th day of April, 1925.

ERNST F. W. ALEXANDERSON.
ALBERT H. MITTAG.